United States Patent [19]
Sommer et al.

[11] 3,748,115
[45] July 24, 1973

[54] PLANT NUTRIENT PRODUCTS

[75] Inventors: Harry J. Sommer, Lafayette, Calif.;
Gordon A. McLaren, Houston, Tex.;
Edmund F. Feichtmeir, Ripon,
Calif.; Robert G. Larsen, Salt Lake
City, Utah; Lawrence E. Wittsell,
Modesto, Calif.

[73] Assignee: Shell Oil Company, Houston, Tex.

[22] Filed: Nov. 16, 1971

[21] Appl. No.: 201,594

[52] U.S. Cl. .................................. 71/64 F
[51] Int. Cl. .......................... C05f 11/00
[58] Field of Search ............... 71/11, 64 F, 64 E

[56] References Cited
UNITED STATES PATENTS
3,276,857  10/1966  Stansbury ............... 71/64 F
3,219,433  11/1965  Brewster et al. ............ 71/64 F Primary Examiner—Samih N. Zaharna
Assistant Examiner—Richard Barnes
Attorney—Frank R. LaFontaine et al.

[57] ABSTRACT

This invention relates to novel plant nutrient products which not only provide a slow and gradual release of water soluble plant nutrients to the agricultural soil, but also afford a means by which the rate of release of plant nutrients from the product can be controlled at a substantially constant (linear) rate throughout the life of the product.

8 Claims, 7 Drawing Figures

INVENTORS:
HARRY J. SOMMER
GORDON A. McLAREN
EDMOND F. FEICHTMEIR
ROBERT G. LARSEN
LAWRENCE E. WITTSELL
BY: *Frank R. St. Fontaine*

THEIR ATTORNEY

INVENTORS:
HARRY J. SOMMER
GORDON A. McLAREN
EDMOND F. FEICHTMEIR
ROBERT G. LARSEN
LAWRENCE E. WITTSELL

BY:

THEIR ATTORNEY

INVENTORS:
HARRY J. SOMMER
GORDON A. MCLAREN
EDMOND F. FEICHTMEIR
ROBERT G. LARSEN
LAWRENCE E. WITTSELL

BY: Frank R. La Fontaine

THEIR ATTORNEY

PLANT NUTRIENT PRODUCTS

BACKGROUND OF THE INVENTION

Description of the Prior Art

Orthodox agricultural practice requires replacement of plant nutrients that are removed from soil by plants growing therein, which nutrients are not readily replaced, or can be replaced only to a limited extent, by the soil itself. Ordinarily, such replacement is effected by introducing into the soil appropriate solutes which can be utilized by plants to provide the deficient nutrients, or solutes that convert in the soil environment into solutes that can be utilized by the plant.

It is essential that the introduction of such solutes into soil in which plants are growing be controlled: (a) an over-abundance of the solutes can injure the plant, or cause too-rapid growth, and/or growth of foliage at the expense of growth and development of the plant's fruit; (b) if the compound that provides the solutes in soluble in water, the solutes are readily leached away by rainwater and irrigation water, so that they are lost to the plants; (c) the solutes may be made available to plants faster than the plants can utilize them, thereby being lost to the plants; (d) the solutes may be adsorbed by, or react with, or otherwise be tied up by the soil so strongly that they are not available to the plants. Ideally, the solutes are supplied at just the rate that the plant can make most efficient use of them, and in a way which permits the plant to obtain them, despite competition by the soil.

Since most synthetic fertilizers used commercially are more or less readily soluble in water, it can be seen that the problem of efficiently applying such fertilizer is a major consideration in effective use thereof. The problem can in many cases be solved, technically, by applying the fertilizer to the rhizosphere of the plant just as it is needed — providing neither too much nor too little. However, in by far the majority of cases, this would require a substantial number of applications of relatively small amounts of fertilizer, and this would be both prohibitively expensive, and overly time-consuming. This would be especially true in the case of permanent plants (i.e., plants that remain in place in the soil for more than one season, as, for example, shrubs, trees, biennial and perennial plants, and the like). In the case of seasonal crop plants, which are relatively shallow-rooted, plant nutrient materials can be introduced into the rhizosphere without undue labor or cost by applying the materials at the time the soil is prepared, during irrigation and/or cultivation to remove weeds, operations which will be conducted in any case. In the case of the permanent plants, with their deeper roots and extensive rhizospheres, however, the introduction of the plant nutrient materials effectively into the rhizosphere without injuring the root system is a serious problem, not solved effectively by shallow application of the nutrient material — during cultivation and/or irrigation, for example. Special applications and techniques — very expensive in terms of time and labor — are required. Further, multiple application of the nutrient material does not solve the problem of the unavailability thereof to the plants due to adsorption by and/or reaction with the soil.

To minimize the risk of damage to the root systems of the plants by application of the fertilizer, and to minimize the time and labor required for such application, it is desirable that the plant nutrient material be of such character, or be so formulated, as to supply the nutrient material to the plant at an appropriate rate over a long period of time — desirably the period being of excess of 6 months (i.e., being of the order of 200 days or more).

Various attempts have been made to produce a plant nutrient product wherein the rate of nutrient release to the soil could be controlled so as to slowly release the nutrients to the soil over a prolonged period of time. Prills or granules of fertilizer have been coated with a thin coating of a water-insoluble material such as waxes or resins or with a coating less soluble than the contained nutrient (urea coated with ureaformaldehyde) such that the coated fertilizer might lie upon or in the soil for an extended period of time before the coating would be eroded or dissolved and the nutrient released to the soil. In another technique known to the art, particulate fertilizer and other plant nutrients, such as trace elements, have been imbedded in a matrix consisting of a solid, essentially hydrophobic substance such as asphalt, bitumen, pitch, natural or synthetic resins, rubbers, oil shale and the like. This technique has even been extended to encapsulating the product formed by the nutrient dispersion in the hydrophobic matrix with a thin but complete coating of a water-insoluble material (U.S. Pat. No. 3,276,857). The plant nutrient products formulated according to this technique when placed in or on the soil will release nutrients to the soil at a reduced rate due to factors such as the reduced concentration or deposition of nutrients per unit weight of the total composition, the inaccessibility of the nutrient particles to the leach water and the reduced solubility of the individual nutrient particles due to partial or complete coating with the binder material. The purported effect of complete encapsulation of the nutrient-hydrophobic matrix product with a water-insoluble material is to reduce the initial rate of dissolution of the nutrient particles on the surface of the product.

The aforementioned products, however, have not completely satisfied the agricultural industry's requirements for a slow release plant nutrient source for two general reasons; first, even many of these formulations do not have sufficient "life" — the time during which the plant nutrients are released — for many applications, and second, the plant nutrient release rate from such formulations is regressive — that is, the release rate is highest from the fresh formulation, the rate falling with time. This characteristic is quite undesirable in many applications — for example, in cases wherein transplanted or established perennial plants are fertilized, a regressive release rate is undesirable because it results in release of a relatively large amount of the plant nutrient material at a time when the plant cannot utilize it, so that the released nutrient material can be leached away and lost, or adsorbed by the soil and made unavailable to the plant, or its concentration built up to a level which can cause injury or death to the plant. Further, the decreasing rate at which the nutrient material becomes available to the plant is opposed to the nutrient requirements of the plant, which, depending on the age of the plant, is substantially uniform or increases slightly with time. Therefore, in many cases, the most desirable plant nutrient formulation would be one which not only releases its nutrients slowly, over a prolonged period of time, but also one wherein the nutrient release rate can be controlled at a constant rate over the life of the formulation such that the nutrients are made available at the times when they can be most efficiently utilized by the growing plants. The formulations known heretofore have not been capable of providing such.

SUMMARY OF THE INVENTION

Surprisingly, it has now been discovered that certain novel plant nutrient products can be designed and formulated in such a way to combine the slow release properties of a matrix dispersion type formulation with a nutrient release rate which is substantially linear or constant over the extended "life" of the product. "Life" being defined as the time period over which the formulation will release nutrients to the soil after placement in the soil. Basically, these novel products comprise one or more plant nutrient materials distributed in an essentially hydrophobic matrix, the product being above a certain minimum bulk and of a specific shape, i.e., substantially cylindrical, said cylindrically shaped matrix being partially coated in a particular manner with a thin layer of a water-insoluble, impermeable material, i.e., such that one or both ends of a narrow strip down the side of the outer periphery of the cylinder remain uncoated; both the dimensions of the product and the extent of the coating being utilized to maintain the ratio of uncoated surface area to the total volume (bulk) of the product within certain limits.

Products of these characteristics will give substantially uniform or linear release of nutrients, which has been heretofore unobtainable with products known to the art, at predetermined rates for predetermined periods of time which at the will of the maker may be very extended in duration. It is felt that the products of this invention, possessing unique and unexpected properties that they do, will prove invaluable in increasing the efficiency of fertilization practices, thereby reducing the environmental hazard which some authorities believe occurs with existing practices, while at the same time reducing the over-all expenditure of time and effort required by existing fertilization techniques in attaining the corresponding crop yield increases.

DESCRIPTION OF THE PREFERRED EMBODIMENTS

Figure 1:
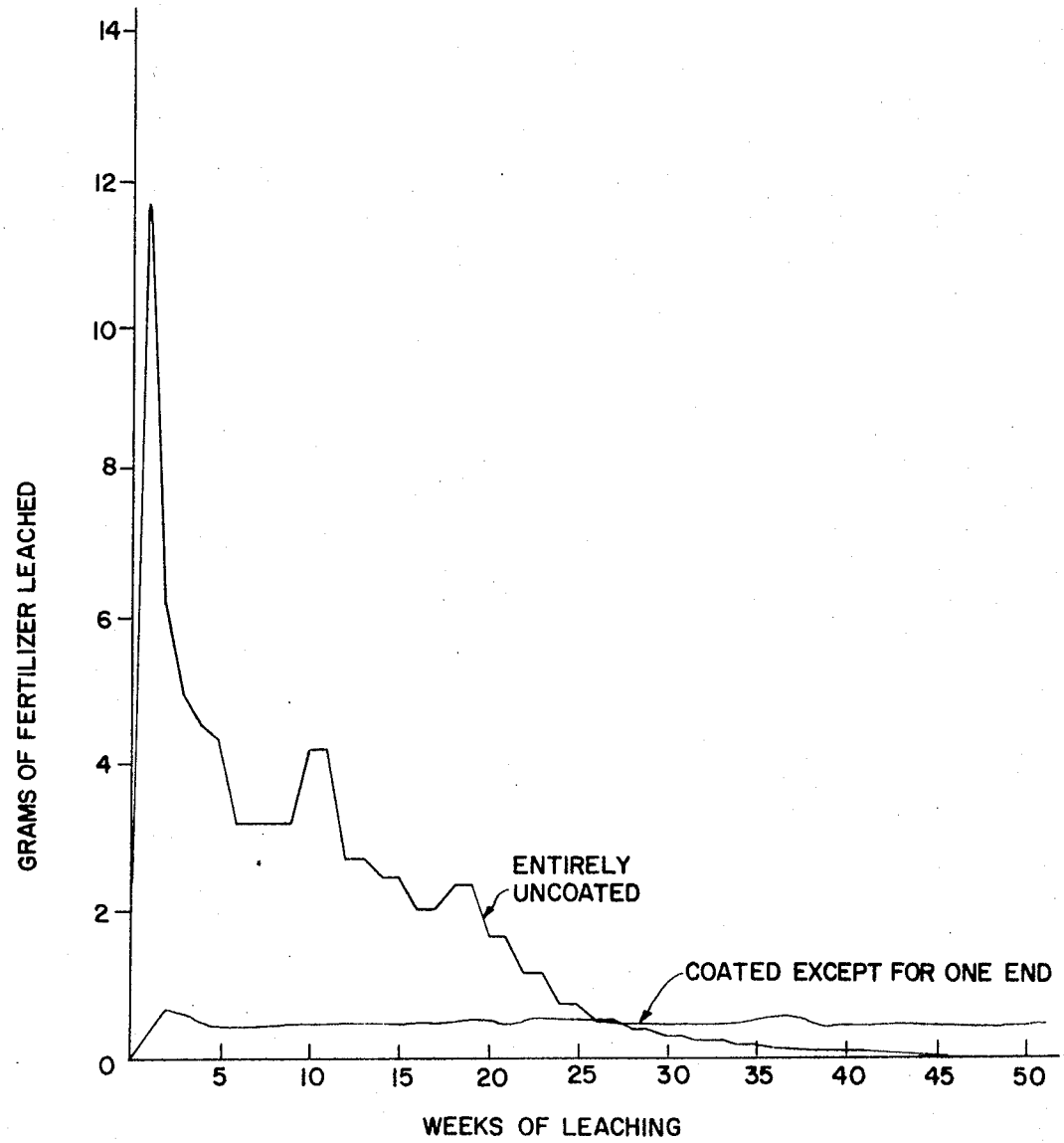

The novel plant nutrient products of this invention can best be described in terms of the following basic physical and chemical characteristics, each of which is essential to the unique and unexpected nutrient release properties observed.

a. One or more finely divided plant nutrient materials uniformly dispersed or imbedded in a hydrophobic matrix.

b. Said matrix being formed in a substantially cylindrical shape having a minimum bulk volume of 0.3 inches$^3$.

c. Said shaped matrix being partially coated with a thin layer of a water-insoluble, impervious coating.

d. Said partial coating covering the surface of the substantially cylindrical shaped product in such a manner that either one or both ends or a strip on the periphery running lengthwise, perpendicular to the ends of the cylinder, remains uncoated such that the ratio of uncoated surface area (in inches$^2$) taken as a unit number to the total volume of the solid cylinder (in inches$^3$) taken as a unit number falls in the range of from 0.025 to 3.00.

These novel products in terms of their essential elements are described in more detail as follows.

The character of the plant nutrient materials, the hydrophobic matrixes and the manner in which these materials are mixed are wholly conventional. Any and all of the customary synthetic plant nutrient materials are suitable. These include such single components as ammonium sulfate, urea, ureaform, ammonium polyphosphate, urea ammonium polyphosphate, diammonium phosphate, ammonium nitrate, calcium nitrate, sodium nitrate, monoammonium phosphate, treble superphosphate, single superphosphate, zinc sulfate monohydrate, magnesium sulfate, potassium nitrate, potassium chloride, calcium chloride, magnesium chloride, potassium sulfate, ferrous sulfate, ferrous sulfate monohydrate, phosphates, and other sources of phosphorus; lime; calcium sulfides; calcium sulfate; sulfur; salts of trace metals such as the salts of molybdenum, iron, nickel, magnesium, vanadium, manganese, copper, zinc, cobalt and the like; borates, etc., or mixtures of one or more of these materials, or any of the so-called "complete" or "balanced" fertilizers of commerce. The hydrophobic matrix can be, for example, bituminous materials such as petroleum residues, including straight run, cracked and blown asphalts, petroleum pitches, oxidized waxes, coal tars, coal tar pitches, asphaltites such as gilsonite, and other residual bituminous materials known in the art; natural or synthetic resins; natural or synthetic rubbers; natural or synthetic waxes, oil shale and the like. Typical suitable materials are described in U.S. Pat. Nos. 2,829,040; 2,936,226; 3,276,857 and 3,050,385; Canadian Pat. No. 631,150; British Pat. No. 828,400 and Irish Pat. No. 396/63. Preferably, the hydrophobic matrix is made up from one or a blend of materials selected from asphalt, natural or petroleum wax, petroleum derived resins and gilsonite. Most preferred would be a matrix made up of asphalt, said asphalt having a penetration value of from 0 to 5 and a softening point of at least 140° F. Optionally, the asphalt may be blended with petroleum wax and/or cutting stock at the rate of up to 20% by weight of the asphalt, blowing flux at a rate of up to 50% by weight of the asphalt or gilsonite at a rate of up to 70% by weight of the asphalt.

Suitable methods for incorporating the plant nutrient material in the matrix also are described in these patents. In general, a most convenient technique is to melt the matrix (where such is feasible) and then thoroughly mix the particulate plant nutrient material in the matrix, then allow the mixture to cool. Other techniques also are available, as described in the aforementioned patents. Particularly suitable for the purposes of this invention is asphalt, with the particular type of asphalt not being known to be critical, provided the asphalt is rigid at 140° F. Preferably the asphalt is mixed with a minor proportion — of the order of up to about 20 percent by weight — of a high melting point wax, to improve the physical characteristics of the melt. The use of such waxes for this purpose is conventional, being described in the aforementioned Irish patent.

The formulation preferably is completely solid — that is, it is free from internal voids, for such voids interfere with the effective, and uniform, leaching of the plant nutrient material from the formulation.

Best results are attained when the particles of plant nutrient material imbedded in the matrix are quite small. Thus, the particles should in all cases pass through an 8-mesh screen (U.S. Sieve Series) but it is preferable that 80 to 90 percent of the particles be retained on a 200-mesh screen. It is preferable, for optimum results, that not more than about 20 percent of the particles pass through a 50-mesh screen. Particles smaller than 270-mesh preferably are not used.

Typical plant nutrient materials that are suitable include the following:

| Material | A* | B* | C** |
|---|---|---|---|
| Screen analysis*** | | | |
| 8 | 99.6 | 100 | 100 |
| 16 | 70.5 | 99 | — |
| 30 | 24.6 | 41 | 82.8 |
| 50 | 11.8 | 13.5 | — |
| 60 | — | — | 30 |
| 100 | 4.0 | 5.0 | 18 |
| 200 | — | — | 11.3 |

* Citrus-type fertilizer: 18.9% nitrogen; 5.4% potassium ($K_2O$) 10% phosphorus ($P_2O_5$).
** Crystalline ammonium sulfate, ground.
*** Percent passing the screen of indicated mesh.

The concentration of plant nutrient material should not exceed 85 percent of the weight of the final product, and preferably amounts to at least 60 percent but not more than 70 percent of the weight of the final product.

The second aspect of this invention deemed to be critical to the unique slow release properties which have been observed is that the matrix formulation be of a substantially cylindrical shape having a minimum bulk volume of 0.30 inches$^3$. The term "bulk volume" as utilized herein may be defined as the total physical volume of the finished formulation, i.e., the volume of water which it would displace if submerged in water. While the maximum bulk volume is not critical since it will primarily be dependent on the rate of nutrient release and effective life of the formulation desired, both of which can be controlled at the will of the maker, for most applications it has been found that a maximum bulk volume of 15 inches$^3$ is a practical upper limit. Because the total bulk volume of the substantially cylindrical formulation is a reflection of the outside dimensions of the formulation, i.e., length and diameter, it has been found that there are preferred limits for these dimensions since, as a practical matter, the ease of manufacture and handling of the finished product as well as its effective life in soil environment will be dependent on these dimensions. For most applications cylinders having a length of from ¾ inch to 6 inches and a diameter of from ¾ inch to 2½ inches will be preferred.

The term "substantially cylindrical", as used in describing the shape of the novel plant nutrient formulations of this invention includes any geometric configuration which approximates a cylinder in shape. Using nomenclature which is known to those skilled in the art of solid geometry the scope of the geometric configuration encompassed by this invention can be described generically as a prism wherein the normal cross section is a circle, an irregular or regular convex polygon or a distorted circle, i.e., an ellipse or a square with rounded corners. For those geometric configurations wherein the normal cross section is an irregular or regular convex polygon, the term diameter discussed in the paragraph above refers to the diameter of the circumscribing circle, i.e., a circle which passes through all the angular points or vertices in the case of a regular polygon or a majority of the angular points or vertices in the case of the irregular polygon. In the case of prisms wherein the normal cross section is a distorted circle, such as an ellipse, the term diameter in the paragraph above refers to the average diameter calculated by averaging the lengths of the semiaxis which may be two or more depending on the irregularity of the curved surface. In the case of prisms wherein the normal cross section is a distorted circle in the form of a square with rounded corners the term diameter refers to the diameter of a circle which approximates the dimensions of the periphery. Of the geometric configurations contemplated for use in this invention preferred because of their ease of manufacture and handling are cylinders, i.e., prisms, wherein the normal cross section is a circle. Most preferred primarily because of desirable handling and release properties are right cylinders, i.e., those cylinders wherein both bases are oriented perpendicular to the lateral surface.

The plant nutrient-matrix products of this invention can be prepared by the conventional methods for shaping materials of similar physical properties; that is, the mixture is prepared, then is extruded, molded, case pressed, or forged into the desired shape.

Another critical aspect of this invention is that the plant nutrient-matrix product be partially coated with a thin layer of water-insoluble material which is essentially impermeable to water. Other essential features of this suitable coating are that it adhere strongly to the formulation, that it be tough, resistant to forces tending to destroy its integrity, as by abrasion, gouging, blows, etc., that it be essentially inert to the effects of chemicals in the formulation and in the soil, and resistant to attack by soil-dwelling animals and micro-organisms. In most cases, it will be found that the hydrophobic material used as the matrix will be suitable as the coating, provided that a coating of sufficient thickness to be an effective barrier to water is used. Since, as noted above, the hydrophobic matrix is preferably made up of asphalt or asphalt blended with either petroleum wax or blowing flux, the preferred coating materials would be neat asphalt or asphalt-wax and/or blowing flux blend.

The partial coating can be applied by conventional techniques, such as dipping the product into a bath of the coating material, spraying the coating onto the product, wrapping the product with the coating material, cementing the coating material onto the product, heating the matrix during an extruding process so that the hydrophobic substance concentrates on the surface so as to form an impervious coating, casting the product into a shell of coating material, or the like. Since another essential aspect of this invention (discussed below) is that the product be partially coated in a certain manner, provisions can be taken prior to, or during the coating process to ensure the uncoated surfaces remain intact, or alternatively, the entire product can be coated and the coating removed from the selected areas after coating by abrasive or cutting techniques. For example, if spraying or dipping application techniques are used, then in cases where one end of the cylindrical product is to remain uncoated, the cylinder can be supported by that end and dipped in a bath of molten coating material or lowered into and rotated in a spray of molten material. If both ends are to remain uncoated, a thin slice can be taken from the other end of the cylinder, coated as above or the cylinder can be supported on both ends and selectively sprayed only on the peripheral surface. If a strip lengthwise along the periphery is to remain uncoated, then a length of tape, the same width as the desired uncoated strip, can be placed on the periphery of the product prior to coating. After coating either by spray or dip techniques, the tape can be removed to expose the uncoated area. Other suitable techniques will readily suggest themselves to ones skilled in the art. Other suitable coating materials will readily suggest themselves to practitioners of the art: Polymeric materials, impregnated paper and wood, and the like.

As indicated above, the final critical feature of the novel plant nutrient products of this invention is that the substantially cylindrical shaped hydrophobic matrix be partially coated with the water-insoluble impermeable coating in a particular manner, i.e., so that either one or both ends or a strip of the periphery running lengthwise, perpendicular to the ends of the cylinder remain uncoated, such that the ratio of uncoated surface area (in inches$^2$) taken as a unit number, to the total volume of the solid cylinder, (in inches$^3$), taken as a unit number is within the range of from 0.025 to 3.00. The criticality of the particular manner in which the substantially cylindrical matrix formulation is partially coated is demonstrated by the experimental results, which are discussed below. As will be seen, the experimental data demonstrate that, surprisingly, a cylindrically shaped hydrophobic matrix containing plant nutrients, when partially coated in any of the specific aforementioned manners, will not only release nutrients to the leach water over a sustained period of time, but will release these nutrients at a substantially constant (linear) rate over the life of the formulation. By constant or linear rate is ment that the quantity of nutrients released per unit of leaching time remains substantially the same over the total leaching period. This result is surprising because the same cylindrical hydrophobic matrix formulation when completely uncoated or similar cylindrical formulations partially coated in a different manner, e.g., cylinders having a hole through the center of the matrix, extending over through the length of the cylinder, said cylinder being coated on all surfaces except the surface of the inner hole, exhibit leaching rates which are decidedly regressive — quantity of nutrient leached per unit time decreases as the time of leaching increases — (see discussion of experimental data below).

The ratio of uncoated surface area to the total volume of the solid cylinder is critical for the products of this invention because it not only affects the shape of the leaching curve, i.e., whether the leaching rate is linear or regressive, but it also is critical in determining the effective "life" of the products of this invention as plant nutrient sources. The time period over which the plant nutrient material will be released — the "life" of the formulation — will depend on several factors, the most primary of which are the inherent specific release rate of the formulation, the "character" of the agricultural soil or environment in which the formulation is placed and the ratio of uncoated surface area to the total volume of the cylindrical formulation. The inherent specific release rate of the formulation is dependent on several factors all of which can be controlled at the will of the maker. These include the solubility of the dispersed plant nutrients in water, the particle size of the plant nutrient materials, their concentration in the hydrophobic matrix and the character of the matrix material itself, i.e., the uniformity with which it coats the entrained nutrient material and the integrity of the protective coat which it provides. The "character" of the agricultural soil or environment refers to the moisture which is available for dissolving the plant nutrient materials and transporting them out of the matrix by diffusion. The ratio of the uncoated surface to the total volume of the cylindrical formulation is important in determining the "life" of the formulation for two reasons. Firstly, the relative size of the uncoated surface area is critical in establishing the absolute rate at which the nutrients will be released from the formulation since it provides the only opening through which the ground water can penetrate the matrix to contact the entrained nutrients and the size of this opening will be determinative of the quantity of fresh water which can enter and the amount of dissolved nutrients which will be released from the product in any given time, secondly, the total volume or bulk of the product is material in determining the size of the plant nutrient reservoir which is subject to depletion by the diffusion process, and therefore, the time period over which nutrient release can take place. Taking the above factors into account, preferred minimum and maximum limits on the ratio of uncoated surface area to total volume have been set such that the resulting plant nutrient products release nutrients to the agricultural soil in the release pattern contemplated by this invention over an extended period of time. In most cases, where season-long or greater nutrient release is desired, ratios in the range of 0.025 to 3.00 have been found to be most suitable.

In order to further illustrate the invention, the following examples are given.

EXAMPLE I

Water Leaching Tests

Leaching as used herein refers to the process of dissolving the plant nutrient materials and diffusing them out of the matrix material into the surrounding aqueous environment.

Accelerated water leaching tests were conducted using the plant nutrient formulations of the invention, i.e., hydrophobic matrix formulations of cylindrical shape partially coated with a water-insoluble, impervious coating such that one or both ends or a strip down the periphery perpendicular to the ends remained uncoated, and for comparative purposes, other matrix formulations of similar shape and composition, either entirely uncoated or partially coated in a different manner, i.e., cylinders having a hole through the center of the matrix, extending over the length of the cylinder, said cylinder being coated on all surfaces except the surface of the inner hole, were subject to water leaching under the same test conditions.

The plant nutrient materials used in this series of tests consisted of ammonium sulfate, diammonium phosphate and potassium sulfate. Either standard grade fertilizers or commercial fertilizer fines or a particular size fraction obtained by screening was used. For those treatments involving a mixture of fertilizers the materials were weighed out in the desired proportions and blended in a twin shell blender. The fertilizer material used in each treatment was weighed out in individual lots of 2800 grams each and were heated to 110°C in shallow pans in a conventional oven preparatory to blending with the asphalt.

Propane pitch with softening point greater than 93°C and penetration less than 2 was broken into chunks and weighed out in lots of 1080 grams each together with 120 grams of Shellmax 400 and heated together to 190° to 200°C in a 10-quart Hobart mixing bowl made of stainless steel. Shellwax 400 is a high melting microcrystalline wax.

After the asphalt-wax was heated to the desired temperatures, the fertilizer was stirred into the asphalt-wax for 15 to 30 seconds using a flat beater in a Model C-100 Hobart Mixer. The blend was poured into molds, compacted and placed into ice water to cool. After 5 minutes, the briquets were removed from the molds, allowed to dry, and weighed. The coating treatment was applied by dipping the briquets into the hot asphalt-wax mix, cooling in cold water, then grinding the coating off the uncoated portion. For all of the plant nutrient products prepared by this technique, the quantity of coating material applied ranged from 5 to 8 percent of the total product weight.

For the water leaching test each plant nutrient product was placed in 500 ml of distilled water in a quart Mason jar which was sealed and laid on its side to keep the entire briquet submerged during the leaching process. The jars were kept in a greenhouse and the temperature of the leach water during the test period ranged from about 15° to 35° C. Determinations of the quantity of plant nutrient which had leached from each product was made on a weekly basis throughout the test period. For each determination the water was removed from the jar and replaced with 500 ml of distilled water. The leachate solution was measured for electrical resistance using a wheatstone bridge and an electrical conductivity cell. The resistance readings were compared with a standard curve and converted to gram plant nutrient material per 500 ml solution, thereby representing the total quantity of plant nutrient material leached out of the product since the last determination. The water was changed sufficiently often that the actual salt concentration in solution was low enough to not affect the leaching rate.

The results of the accelerated water leaching tests are plotted in FIGS. 1 through 5. FIG. 1 illustrates the leaching rates of cylinders, 3 in. long by 1⅝ in. in diameter, which are exactly alike except that one is entirely uncoated and the other is coated on the periphery and one end, leaving the other end open for leaching. The plant nutrient fraction of these cylinders, which made up 70 percent by weight of the formulation prior to coating, was composed of 12 percent diammonium phosphate (21 – 53 – 0), 76 percent ammonium sulfate (21 –0–0 ) and 12 percent potassium sulfate (0 – 0 –52). Where the cylindrical formulation is uncoated the leaching rate was strongly regressive, the nutrient content of the formulation being completely depleted at the end of 43 weeks of leaching. This is in direct contrast to the formulation coated except for one end which produces an exceptionally linear release rate which is highly desirable for most agronomic uses.

Figure 2:
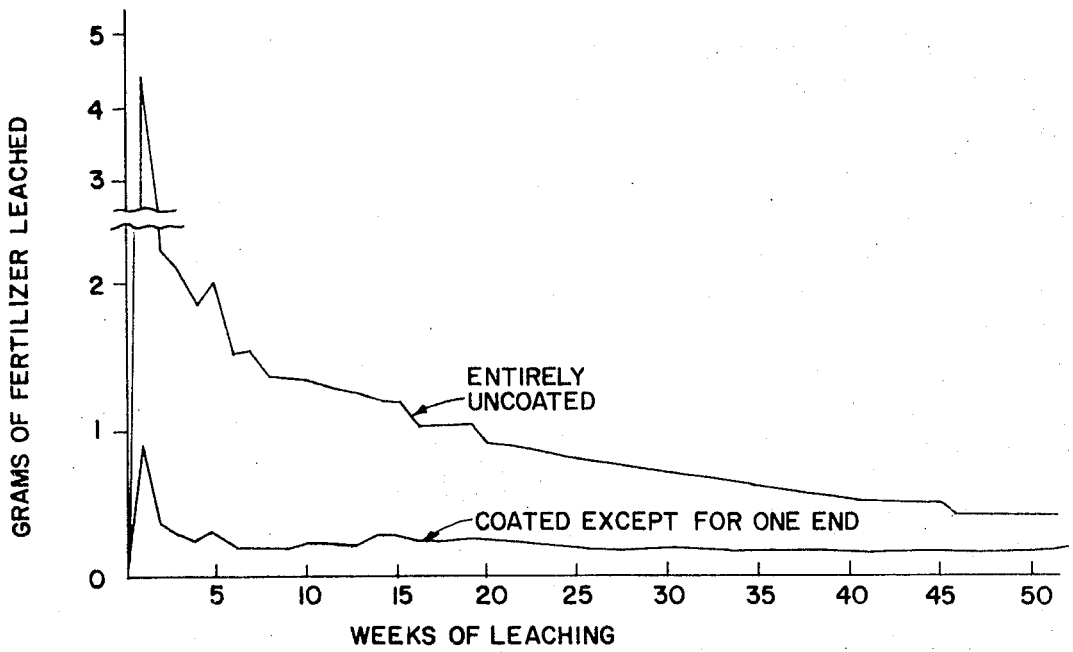

FIG. 2 compares the leaching rates of cylindrical formulations which are identical to those tested in FIG. 1 except the plant nutrient fraction consists solely of ammonium sulfate. Here again the uncoated formulation exhibited a regressive release rate whereas the formulation coated except for one end gave a release rate which was sufficiently linear to meet agronomic requirements.

Figure 3:
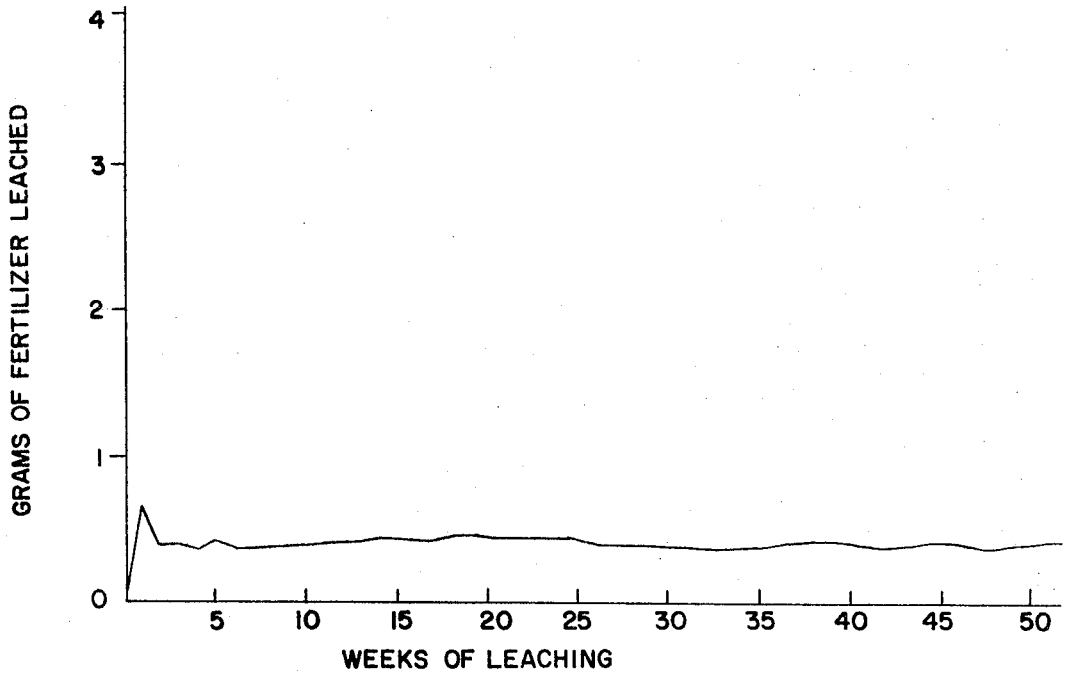

FIG. 3 illustrates the leaching rate of a cylindrical plant nutrient formulation, 3 in. long by 1⅝ in. in diameter, completely coated except for a strip ⅛ in. wide running along the periphery perpendicular to the ends. The plant nutrient fraction in this case was ammonium sulfate fines, present at 70 percent by weight of the product prior to coating. Here again, surprisingly, the release rate of the formulation was substantially linear over the test period.

Figure 4:
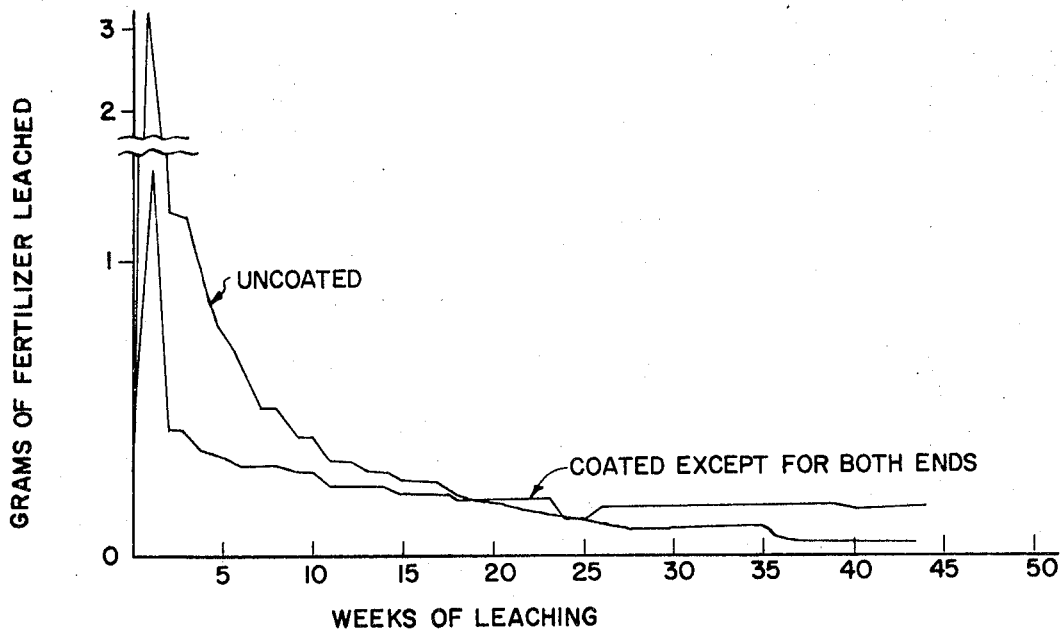

FIG. 4 compares the leaching rates of cylindrical formulations, 1½ in. long by 1 in. in diameter, which are exactly alike except that one is entirely uncoated and the other is coated on the periphery leaving both ends open for leaching. The plant nutrient fraction, which made up 70 percent by weight of the formulation prior to coating, was composed of 43 percent ammonium sulfate (21 – 0 – 0), 28 percent diammonium phosphate (21 – 53 – 0) and 29 percent potassium sulfate (0 – 0 – 52). Here again the nutrient release rate from the uncoated formulation is decidedly regressive while the comparative release rate from the formulation which is coated on the periphery is substantially linear.

Figure 5:
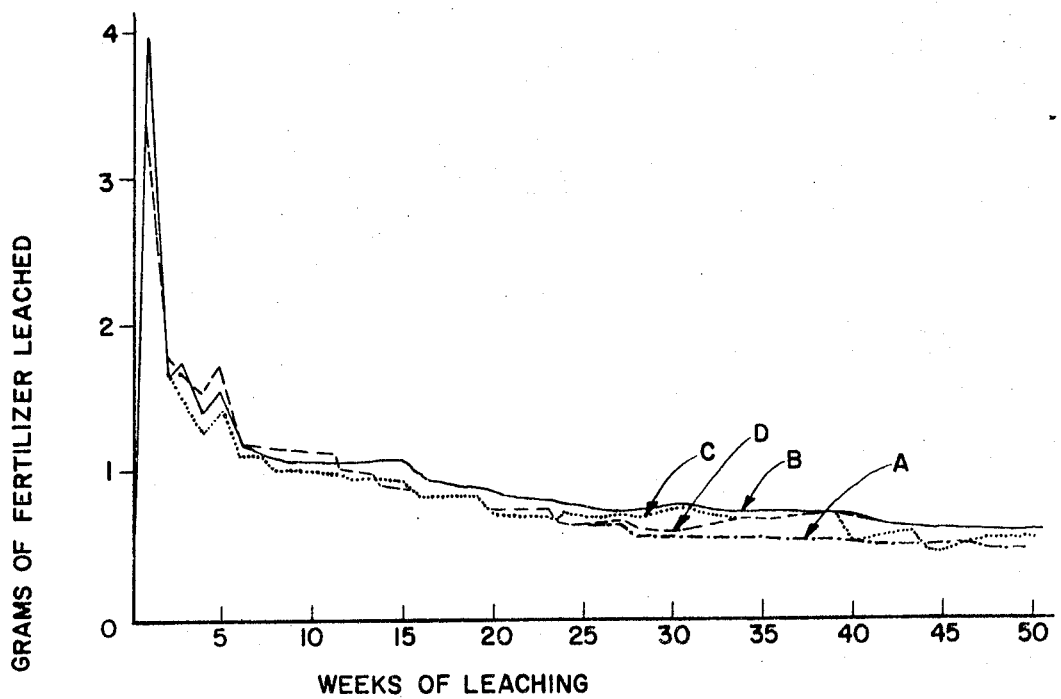

FIG. 5 demonstrates the criticality of the manner in which the cylindrical shaped formulation is partially coated. The data plotted in this figure was derived from leaching test conducted with several cylindrically shaped formulations having a hole of varying diameter cut through the center of the matrix, said hole extending through the length of the cylinder such that the formulation is actually tubular in shape. These tubular products were coated on all surfaces except the surface of the inner hole. All of the products tested were 3 in. long by 1⅝ in in diameter and the diameter of the inner hole varied from ½ in. to ⅛ in. For identification purposes the formulations are designated as follows in terms of the diameter of the inner hole: formulation A — 0.500 in.; B — 0.250 in.; C — 0.187 in. and D — 0.125 in. The plant nutrient fraction in all cases was ammonium sulfate fines, present at 70 percent by weight of the formulation prior to coating. As indicated by the leach data plotted in FIG. 5, all of the tubular formulations exhibited approximately the same leaching rates all of which were regressive, approximating the leaching profile observed for the uncoated cylinders in FIGS. 1, 2 and 4.

EXAMPLE II

Soil Leaching Tests

Leaching as used herein refers to the process of dissolving the plant nutrient materials and diffusing them out of the matrix material into the surrounding soil or plant rooting medium.

Using a procedure similar to that described above in Example I cylindrical plant nutrient formulations, 1 in. in diameter and either 1 or 2½ in. long, both completely uncoated or coated only on the periphery, were formulated. These plant nutrient products contained as the plant nutrient fraction fertilizer grade ammonium sulfate, present at 70 percent by weight of the formulation prior to coating. These plant nutrient products were subjected to rigorous leaching in moist soil according to the following procedure: each plant nutrient product was placed in a column of Hanford fine sandy soil 5 in. in diameter and 12 in. high. The cylinders were placed vertically and the columns were mounted vertically. Sufficient water was added to the column throughout the test period to keep the column moist but not saturated. The columns were held in a greenhouse while the test was underway and were subject to rather wide ranges in ambient temperatures. At the beginning of the test determinations of the amount of plant nutrient which had leached out of each formulation was made on a daily basis. After a few weeks the determinations were made weekly and then semimonthly. For each determination 500 ml of distilled water was poured on top of the column and allowed to percolate through the soil past the plant nutrient product. The leachate was collected at the bottom of the column, filtered and the quantity of dissolved nutrient was determined using the procedure described in Example I, above. There was no plant growth.

Figure 6:
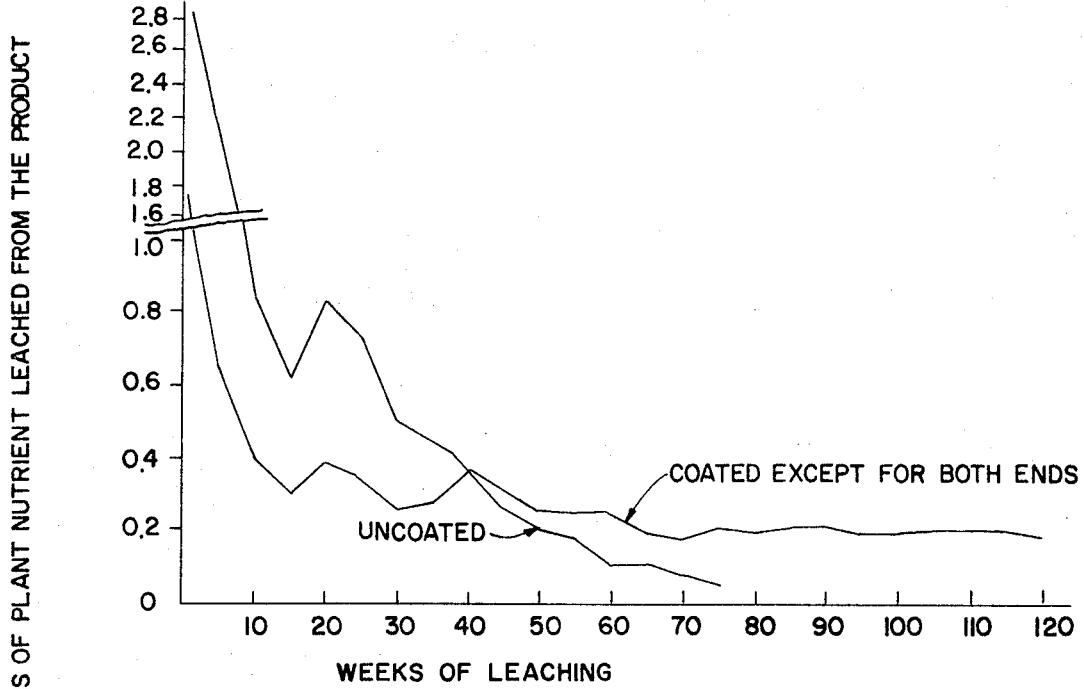
Figure 7:
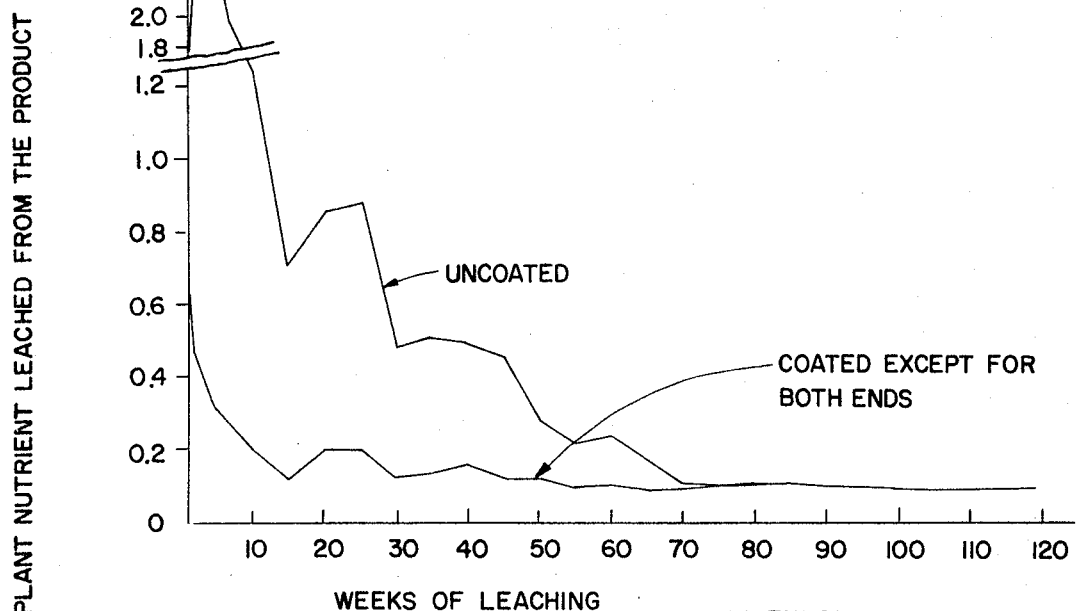

The results of the leaching studies in moist soil are reported in FIGS. 6 and 7. FIG. 6 illustrates the comparative leaching rates of cylinders, 1 in. in length, which are exactly alike except one set is completely uncoated while the other is coated on the periphery, leaving both end surfaces open for leaching. Where the cylindrical formulation is entirely uncoated, the leaching rate was decidedly regressive over the 75 week period in which readings were taken, whereas the formulation coated on the periphery exhibited a substantially linear release rate over the entire 119 week period of the test.

FIG. 7 compares the leaching rates of cylindrical formulations which are identical to those tested in FIG. 1 except the cylindrical formulations in this case were 2½ in. long. Here again the uncoated formulation exhibits a regressive release rate through the 75 week period which it was under test whereas the formulation coated on the periphery exhibited a substantially linear release rate over the 119 week period which it was under test.

We claim as our invention:

1. A slow release plant nutrient composition comprising:
   a. one or more plant nutrient materials uniformly dispersed or imbedded in a hydrophobic matrix;
   b. said matrix being formed in a substantially cylindrical shape having a minimum bulk volume of 0.30 inches$^3$;
   c. said shaped matrix being partially coated with a thin layer of water-insoluble, impervious coating;
   d. said partial coating covering the surface of the substantially cylindrical shaped product in such a manner that either one or both ends or a strip on the periphery running lengthwise, perpendicular to the ends of the cylinder, remains uncoated such that the ratio of uncoated surface area to the total volume of the solid cylinder is in the range of from 0.025 to 3.00.

2. A plant nutrient product of claim 1 wherein the matrix is formed in the shape of a right cylinder.

3. A plant nutrient product of claim 2 wherein the hydrophobic matrix is made up of asphalt and one from the group consisting of;
   a. 0 to 20 percent petroleum wax;
   b. 0 to 20 percent cutting stock;
   c. 0 to 20 percent of a mixture of petroleum wax and cutting stock;
   d. 0 to 50 percent blowing flux and
   e. 0 to 75 percent of gilsonite;
all percentages being based on the weight of the asphalt.

4. A plant nutrient product of claim 2 wherein the partial coating covers the cylinder in a manner such that the one end remains uncoated.

5. A plant nutrient formulation of claim 2 wherein the partial coating covers the cylinder in a manner such that both ends remain uncoated.

6. A plant nutrient formulation of claim 2 wherein the partial coating covers the cylinder in a manner such that a strip on the periphery running lengthwise, perpendicular to the ends, remains uncoated.

7. A plant nutrient product of claim 3 wherein the water-insoluble, impervious partial coating is of the same composition as the material utilized in the hydrophobic matrix.

8. A plant nutrient product of claim 6 wherein the cylindrical formulation is from ¾ to 6 inches in length and from ¾ to 2½ inches in diameter.

* * * * *